United States Patent
Wang et al.

(10) Patent No.: US 8,406,573 B2
(45) Date of Patent: Mar. 26, 2013

(54) INTERACTIVELY RANKING IMAGE SEARCH RESULTS USING COLOR LAYOUT RELEVANCE

(75) Inventors: Jingdong Wang, Beijing (CN); Shipeng Li, Beijing (CN); Xian-Sheng Hua, Beijing (CN); Yinghai Zhao, Hefei Anhui (CN)

(73) Assignee: Microsoft Corporation, Redmond, WA (US)

( * ) Notice: Subject to any disclaimer, the term of this patent is extended or adjusted under 35 U.S.C. 154(b) by 891 days.

(21) Appl. No.: 12/341,953

(22) Filed: Dec. 22, 2008

(65) Prior Publication Data
US 2010/0158412 A1 Jun. 24, 2010

(51) Int. Cl.
*G06K 9/60* (2006.01)
(52) U.S. Cl. .......................... 382/305; 382/162
(58) Field of Classification Search .................. None
See application file for complete search history.

(56) References Cited

U.S. PATENT DOCUMENTS

| | | | |
|---|---|---|---|
| 5,579,471 A | 11/1996 | Barber et al. | |
| 5,802,361 A | 9/1998 | Wang et al. | |
| 5,893,095 A | 4/1999 | Jain et al. | |
| 6,181,818 B1 | 1/2001 | Sato et al. | |
| 6,519,360 B1 | 2/2003 | Tanaka | |
| 6,567,814 B1 | 5/2003 | Bankier et al. | |
| 6,968,366 B1 | 11/2005 | Zhang et al. | |
| 7,657,100 B2 | 2/2010 | Gokturk et al. | |
| 2003/0109940 A1* | 6/2003 | Guntzer et al. | 700/52 |
| 2003/0160824 A1 | 8/2003 | Szumla | |
| 2003/0187844 A1 | 10/2003 | Li et al. | |
| 2007/0019864 A1 | 1/2007 | Koyama et al. | |
| 2007/0223811 A1* | 9/2007 | Kudo et al. | 382/162 |
| 2007/0288432 A1 | 12/2007 | Weltman et al. | |
| 2008/0046410 A1* | 2/2008 | Lieb | 707/3 |
| 2008/0118151 A1 | 5/2008 | Bouguet et al. | |

(Continued)

FOREIGN PATENT DOCUMENTS

| | | |
|---|---|---|
| CN | 1926575 | 3/2007 |
| CN | 101154290 | 4/2008 |

(Continued)

OTHER PUBLICATIONS

Bamidele, et al., "An Attention Based Approach to Content Based Image Retrieval", retrieved on May 26, 2010 at <<http://muscle.ercim.org/images/DocumentPDF/MP_220_BTTJ_paper_book%20-%20final.pdf>>, Kluwer Academic Publishers, BT Technology Journal, vol. 22, No. 3, Jul. 2004, pp. 151-160.

(Continued)

*Primary Examiner* — Andrew W Johns
*Assistant Examiner* — Siamak Harandi
(74) *Attorney, Agent, or Firm* — Lee & Hayes, PLLC (57) ABSTRACT

This disclosure describes various exemplary user interfaces, methods, and computer program products for the interactively ranking image search results refinement method using a color layout. The method includes receiving a text query for an image search, presenting image search results in a structured presentation based on the text query and information from an interest color layout. The process creates image search results that may be selected by the user based on color selection palettes or color layout specification schemes. Then the process ranks the image search results by sorting the results according to similarity scores between color layouts from the image search results and the interest color layout from a user based on the color selection palettes and the color layout specification schemes.

13 Claims, 10 Drawing Sheets

U.S. PATENT DOCUMENTS

| | | | |
|---|---|---|---|
| 2008/0162469 | A1 | 7/2008 | Terayoko et al. |
| 2008/0222560 | A1 | 9/2008 | Harrison |
| 2009/0254455 | A1 | 10/2009 | Rothey et al. |
| 2009/0254539 | A1 | 10/2009 | Wen et al. |
| 2009/0313294 | A1 | 12/2009 | Mei et al. |
| 2011/0191334 | A1 | 8/2011 | Hua et al. |

FOREIGN PATENT DOCUMENTS

| | | |
|---|---|---|
| EP | 0713186 | 7/2006 |
| KR | 20060068877 A | 6/2006 |

OTHER PUBLICATIONS

Guntzer, et al., "Optimizing Multi-Feature Queries for Image Databases", retrieved on May 26, 2010 at <<http://citeseerx.ist.psu.edu/viewdoc/download?doi=10.1.1.31.9882&rep=rep1&type=pdf>>, Morgan Kaufmann Publishers, VLDB Endowment, Proceedings of Conference on Very Large Data Bases, Cairo, EG, 2000, pp. 419-428.

PCT/US2006/066150 Search Report, dated Jun. 16, 2010, 10 pages.

Aigrain, et al., "Content-based Representation and Retrieval of Visual Media: A State-of-the-Art Review", retrieved on Nov. 12, 2008 at <<http://paigrain.debatpublic.net/docs/MTAP.pdf>>, pp. 1-26.

Cui, et al., "IntentSearch: Interactive On-line Image Search Re-ranking", retrieved on Nov. 12, 2008 at <<http://www.stanford.edu/~jycui/data/Jingyu_Cui_MM08e.pdf>>, ACM, MM 2008, Vancouver, British Columbia, Canada, Oct. 26-31, 2008, 2 pages.

Cui, et al., "Real Time Google and Live Image Search Re-ranking", retrieved on Nov. 12, 2008 at <<http://www.stanford.edu/~jycui/data/Jingyu_Cui_MM08de.pdf>>, ACM, MM 2008, Vancouver, British Columbia, Canada, Oct. 26-31, 2008, 4 pages.

Jacobs, et al., "Fast Multiresolution Image Querying", retrieved on Nov. 12, 2008 at <<http://grail.cs.washington.edu/projects/query/mrquery.pdf>>, Department of Computer Science and Engineering, University of Washington, Seattle, Washington, 10 pages.

Lin, et al., "Web Image Retrieval Re-Ranking with Relevance Model", retrieved on Nov. 12, 2008 at <<http://www.informedia.cs.cmu.edu/documents/wi03.pdf>>, 7 pages.

Valova, et al., "Retrieval by Color Features in Image Databases", retrieved on Nov. 12, 2008 at <<http://www.sztaki.hu/conferences/ADBIS/17-Valova.pdf>>, 16 pages.

Veltkamp, et al., "Content-Based Image Retrieval Systems: A Survey", retrieved on Nov. 12, 2008 at <<http://give-lab.cs.uu.nl/cbirsurvey/cbir-survey.pdf>>, Oct. 28, 2002, pp. 1-62.

Wang, et al. "Layout-Sensitive Image Search", Microsoft Research Asia, University of Science and Technology of China, Dec. 17, 2008, 10 pages.

Worring, et al., "Interactive Retrieval of Color Images", retrieved on Nov. 12, 2008 at <<www.science.uva.nl/research/reports-isis/2001/ISISreport2001-08.ps>>, 2001, 2 title pages and 1-30.

Yang, et al., "Semantic Image Browser: Bridging Information Visualization with Automated Intelligent Image Analysis", retrieved on Nov. 12, 2008 at <<http://www.viscenter.uncc.edu/TechnicalReports/CVC-UNCC-06-02.pdf>>, 8 pages.

Flickner, et al., "Query by Image and Video Content: The QBIC System", IEEE Computer Society, Computer, vol. 28, Issue 9, Sep. 1995, pp. 23-32.

Office Action for U.S. Appl. No. 12/700,613, mailed on Jan. 13, 2012, Xian-Sheng Hua, "Smart Interface for Color Layout Sensitive Image Search", 20 pgs.

Office action for U.S. Appl. No. 12/700,613, mailed on Sep. 18, 2012, Hua et al., "Smart Interface for Color Layout Sensitive Image Search", 22 pages.

Chinese Office Action mailed Sep. 24, 2012 for Chinese patent application No. 200980152978.7, a counterpart foreign application of U.S. Appl. No. 12/341,953, 9 pages.

Office action for U.S. Appl. No. 12/700,613, mailed on Jan. 16, 2013, Hua et al., "Smart Interface for Color Layout Sensitive Image Search", 21 pages.

\* cited by examiner

INTERACTIVELY RANKING IMAGE SEARCH RESULTS USING COLOR LAYOUT RELEVANCE

TECHNICAL FIELD

The subject matter relates generally to image searching, and more specifically, to refining image search results through interactions with the image visual information.

BACKGROUND

The rapid development of commercial image search engines allows users to easily retrieve a large number of images, simply by typing in a text query usually on a search engine. However, a problem with the existing search engines is the search results only use a relevance of surrounding text information of images associated with the text query. The existing search engines do not use image visual information in providing search results. As a result, there are ongoing efforts to improve image search results by leveraging the image content, which includes useful image visual information.

The growth of digital image content has made it more of a challenge to browse through the large amount of search results. To help with retrieving images, techniques have been tried for image search results refinement. Two conventional techniques commonly employed to assist with results refinement are content based reranking and IntentSearch.

Content based reranking may rely on image clustering and categorization to provide a high-level description of a set of images. While content based reranking uses visual information to reorder the search results, it does not take into consideration the intent of the user. On the other hand, IntentSearch provides an interface to allow users to indicate a few images of interests, and automatically attempts to guess the intent of the user to reorder image search results. However, guessing the intent of the user is somewhat difficult based on selected images. Thus, these conventional approaches do not really address the intent of the user for the images along with using image visual information.

Therefore, it is desirable to find ways to refine image search results through user interactions with the image visual information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes various exemplary user interfaces, methods, and computer program products for interactively ranking image search results using a color layout relevance, as part of image retrieval. The interactively ranking image search results using a color layout relevance method includes presenting image search results in a structured presentation based on the text query submitted by a user and information from the user for an interest color layout. The process enables an interactive design of selecting from color selection palettes or color layout specification schemes. Next, a similarity evaluation compares similarities between the interest color layout and the color layouts corresponding to all of the images in the search results. Then the process orders the image search results according to calculated similarities scores.

Thus, this disclosure allows the user to interact with the image search results, which addresses the intent of the user. As a result, this interactively ranking image search results using a color layout relevance process uses a color layout relevance approach to make it more convenient for the user to specify the color layout of interest without requiring any special knowledge or skills.

BRIEF DESCRIPTION OF THE DRAWINGS

The Detailed Description is set forth with reference to the accompanying figures. The teachings are described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to various exemplary user interfaces, methods, and computer program products for interactively ranking image search results using a color layout relevance for image retrieval. There are conventional image retrieval techniques to handle image search using text query. These techniques typically focus on text query without leveraging the image visual information and are not concerned with the intent of the user. Thus, the interactively ranking image search results using a color layout relevance described herein allows users to search for images by leveraging the rich and useful image visual information and incorporating user input on interest color layout in the process to refine image search results.

In one aspect, the interactively ranking image search results using a color layout relevance process uses a color layout extraction, an interest color layout specification, and a layout ranker. The color layout extraction is performed for each image after the image is crawled from an internet. Furthermore, the process receives user input for the interest color layout and reorders the image search results based on the intent of the user. The layout ranker includes a similarity evaluation between interest color layout and color layout of an image. In particular the similarity includes a color appearance compatibility, a spatial distribution consistency, and a contextual layout similarity.

In another aspect, the process using the interactively ranking image search results using a color layout relevance provides an interactive user interface. The user interface allows users to easily scribble to indicate interest color layout. In addition, the user interface allows users to pick out colors of interest and to specify a color layout.

The described interactively ranking image search results using color layout relevance method offers advantages to the user in terms of convenience, flexibility, and adaptability to the user during image retrieval. Furthermore, the interactively ranking image search results using color layout relevance method described offers low storage requirement, representativeness with proposed layout similarity and color layouts, and efficiency as the computing cost of feature extraction is low. By way of example and not limitation, the interactively ranking image search results using color layout relevance method described herein may be applied to many contexts and environments. For example, the interactively ranking image search results using color layout relevance method may be implemented to support image retrieval by web searching, on search engines, with web-scale applications, on enterprise networks, on content websites, on content blogs, with multimedia, and the like.

Illustrative System

Figure 1:
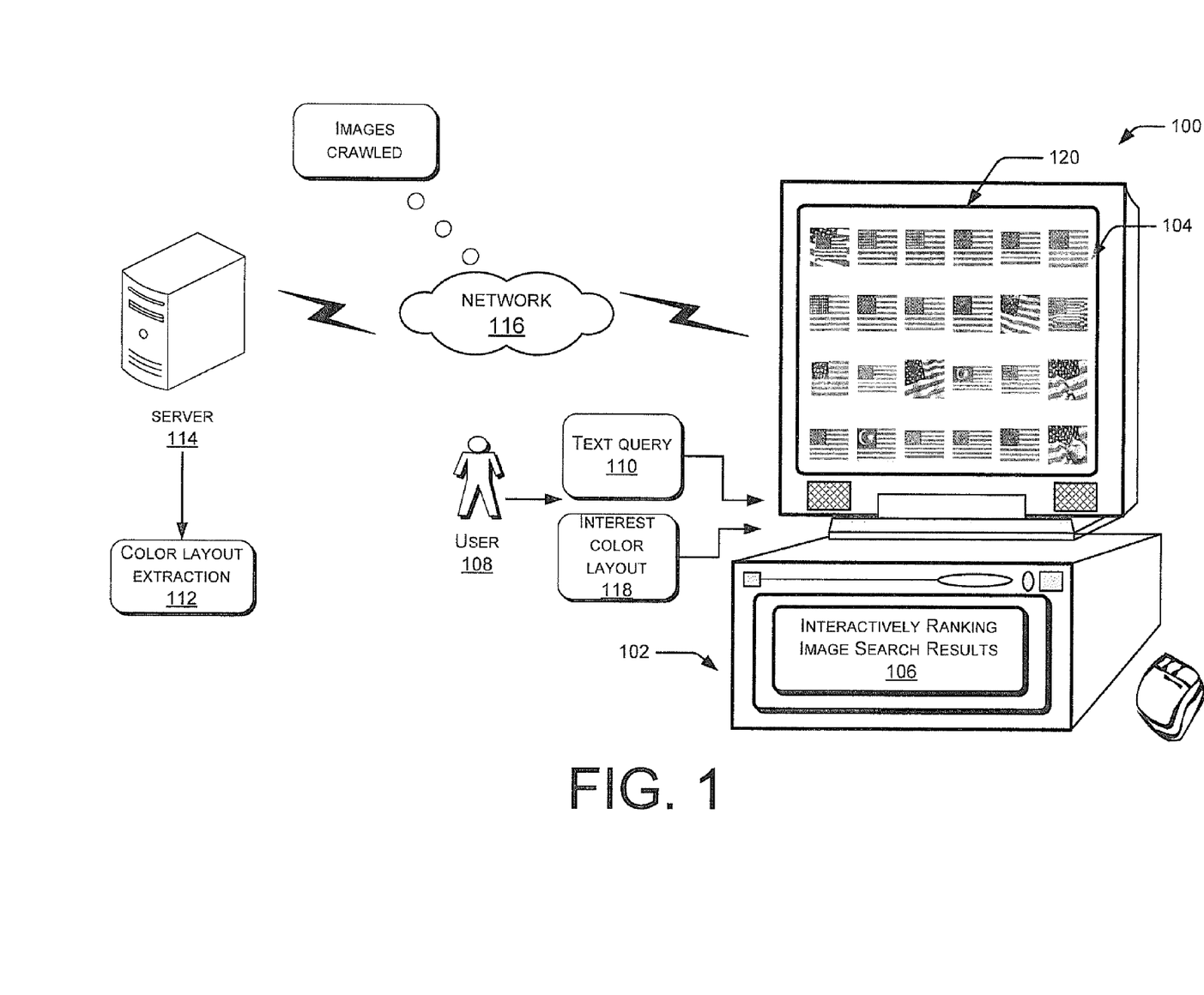
FIG. 1 is a block diagram of an exemplary system for an interactively ranking image search results using color layout relevance application.

FIG. 1 is an overview block diagram of an exemplary system 100 for interactively ranking image search results using color layout relevance for retrieving images. The system 100 includes architecture of some components on a client side and a server side. Alternatively, these components may reside in multiple other locations. For instance, all of the components of FIG. 1 may reside on the client side or the server side. Furthermore, two or more of the illustrated components may combine to form a single component at a single location.

Shown is a computing device 102 found on the client side. Computing devices 102 that are suitable for use with the system 100, include, but are not limited to, a personal computer, a laptop computer, a desktop computer, a workstation computer, a personal digital assistance, a cellular phone, a smart phone, and the like. The computing device 102 on the client side may include a monitor 104 or a display to show the image results for the interactively ranking image search results using color layout relevance, as part of image retrieval.

The system 100 may include interactively ranking image search results using color layout relevance as, for example, but not limited to, a tool, a method, a solver, software, an application program, a service, technology resources which include access to the internet, part of a web browser, part of a commercial or a small search engine, and the like. Here, the interactively ranking image search results using color layout relevance is implemented as an application program 106. In other implementations, interactively ranking image search results using color layout relevance is provided as a service or part of a commercial search engine.

The term, interactively ranking image search results using color layout relevance application program 106, may be used interchangeably with the terms, interactively ranking image search refinement, color layout relevance, or interactively ranking image research results.

The color layout relevance application program 106 makes it more convenient for a user 108 in searching for images. Traditional techniques for image retrieval only address the text query. When in reality, an image is usually associated with text, rich and useful image visual information. As mentioned, these traditional techniques focused on text query without leveraging the image visual information and are not concerned with the intent of the user. This has been a problem for image retrieval in satisfying the intent of the user. These traditional approaches process each text query, without consideration of intent of the user. There are other conventional techniques that attempted to guess at the intent of the user, which is not very effective or accurate.

In an implementation, an initial input for the color layout relevance application program 106 is a specific text query 110 submitted by the user 108. The specific text query 110 submitted by the user 108 is based on an intent or goals of the user. For example, the user 108 may desire to find certain returned images to assist in their work. The user 108 may be an illustrator desiring certain search images for a presentation, a poster design, slides, and the like.

The server side of the system 100 includes a color layout extraction 112 that may be located on a server 114. There may be one or more servers, databases, or processors located on the server side. On the server side, the images are crawled from the internet 116, and meta data are attached with the images. The images may contain text attached. For example, a search engine may attach text to the images, i.e., MS Live Image Search. The color layout extraction 112 includes off-line image meta data extraction, which includes performing color layout extraction 112 for each image after the image is crawled from the internet.

As mentioned above, the color layout extraction 112 includes images, texts, and color layout. The color layout extraction 112 offers several properties: low storage, representativeness, and efficiency. Low storage is one of the main requirements in web-scale applications. This requirement is due to a large number of images, and a need to precompute the associated features to avoid on-line computation. Representativeness deals with how the extracted features can express the spatial layout characteristics. Moreover, with the proposed layout similarity evaluation scheme, different color layouts can be easily discriminated using this feature. Efficiency keeps the cost as low as possible to compute a feature extraction. This is desired in dealing with web-scale number of images.

Once the user 108 types in a specific text query 110, image search results are returned from the server 114, which operates similar to an existing image search engine, i.e., MS Live Image Search. Implementation of the color layout relevance application program 106 includes, but is not limited to, image retrieval by web searching on the internet 116, using search engines, enterprise networks, content websites, content blogs, and the like. After the images are returned, the user 108 may select from colors of interest and specify interest color layout 118 on the image search results. Then the process evaluates similarities to compare interest color layout and the color layouts corresponding to all of the images in the search results.

Then, the images are ordered based on the calculated similarities. As shown here, the color layout relevance application program 106 delivers an reordering of the image search results 120, where ranking similarity scores are ordered for ranking in image retrieval evaluation. Thus, the color layout relevance application program 106 evaluates the text query 110, receives user 108 input on colors of interest and interest color layout 118, and returns relevant ordered image search results 120 to the user 108. The image search results are based on a specific query and intent of the user 108 along with interest color layout selections by the user 108.

Illustrative Overview Process

Figure 2:
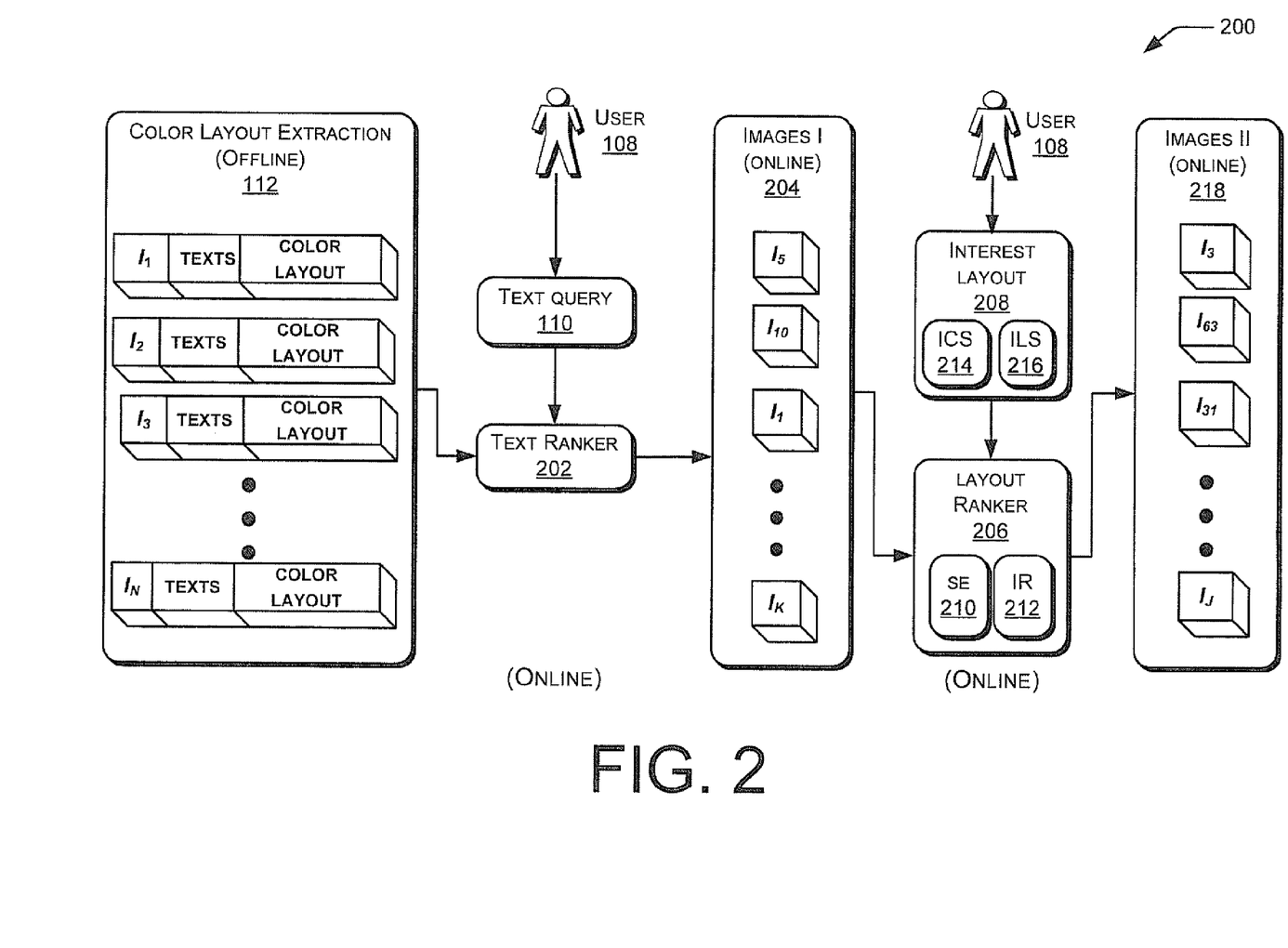
FIG. 2 is a block diagram showing an exemplary process for the interactively ranking image search results using color layout relevance of FIG. 1.
Figure 3:
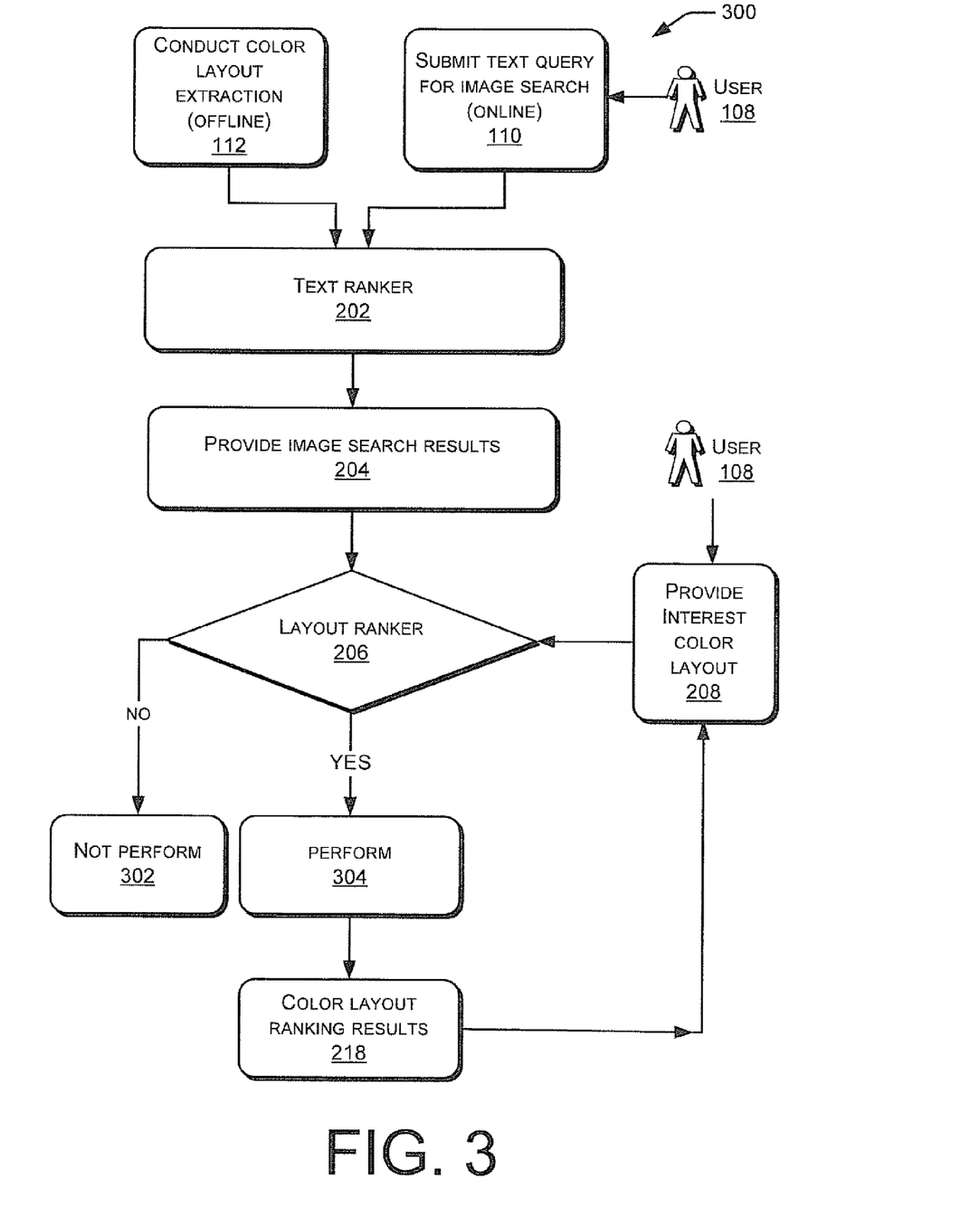
FIG. 3 is an overview flowchart showing the showing the exemplary process for the interactively ranking image search results using color layout relevance.

FIGS. 2 and 3 illustrate an exemplary process for the color layout relevance application program 106. FIG. 2 is a block diagram showing an exemplary process 200 for the color layout relevance approach of FIG. 1. FIG. 3 is a flowchart showing the exemplary process 300 for the color layout relevance approach of FIG. 1.

Illustrated in FIGS. 2 and 3 are exemplary block diagram and flowchart, respectively, of the process for implementing the color layout relevance application program 106 to provide a benefit to users in searching for relevant images. For ease of understanding, the method is delineated as separate steps represented as independent blocks in FIGS. 2 and 3. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

FIG. 2 is a block diagram showing an exemplary process 200 for the color layout relevance approach. The process 200 provides an exemplary implementation of the color layout relevance application program 106 of FIG. 1. Starting on the left side is block 112, which represents the color layout extraction. As mentioned previously, the color layout extraction 112 is computed off-line to offer low storage and low computation cost in extracting features. Color layout extraction 112 obtains the color layout for images, and then describe the images using images themselves, associated texts, and color layouts: $I_1$, texts, color layout; $I_2$, texts, color layout; $I_3$, texts, color layout; . . . and $I_N$, texts, color layout. There are two steps involved in the color layout extraction 112 process: extract representative colors for each grid and concatenate the grids into several layouts with each corresponding to the same quantized color. A more detailed discussion of color layout extraction follows in FIG. 6.

Block 202 represents a text ranker for ranking the text. Text ranker 202 takes the text information from the color layout extraction 112. This process 202 receives the specific text query 110 from the user 108 to rank the text. Text ranker 202 is performed online, which uses the specified text query 110 as input submitted by the user 108.

Block 204 represents the image search results I: $I_5$, $I_{10}$, $I_1$, . . . $I_K$ that are generated from the text ranker 202, which is online. These image search results 204 generated have been ranked according to text submitted 110 by the user 108. However, these image search results are not the final image search results, as the color layout relevance application program 106 uses feedback on interest color layout from the user 108 to provide final image search results.

Block 206 represents a layout ranker for ranking the images according to the interest color layout from the user. Layout ranker 206 is performed online, which receives as input the images 204 and their associated color layout and input from by the user 108 for the interest color layout. In this process, the color layouts of the images are used to compare with the interest color layout by the user and then the similarities between the color layout of images and interest color layout are used to reorder the images. The layout ranker 206 includes two substeps: similarity evaluation (SE) scheme 210 and image ranking (IR) 212. Similarity evaluation (SE) scheme 210 satisfies two properties: computationally efficient and discriminative. Computationally efficient means precomputing both color similarity and layout component-wise similarity lookup tables to avoid online computation. Discriminative means the similarity evaluation scheme has an ability to discriminate among the different color layouts. Image ranking (IR) 212 is obtained by directly sorting the image search results 204 using a similarity score from the similarity evaluation scheme 210.

Block 208 representing interest color layout, which includes interest color selection (ICS) 214 and interest layout specification (ILS) 216. Interest color selection 214 provides color palettes to allow the user 108 to select from a color of interest. There are three types of palettes to choose from: a standard color palette, query-dependent palette, and colors from the search results. After the user 108 selects the interest color, the user 108 can then perform the interest layout specification 216. The user 108 may select from three different types of interest color layouts: free-scribbling, a template layout, query-dependent layouts, and a layout from an example image. More detailed discussion of the interest layout 208 follows in FIGS. 4 and 5.

Block 218 represents the image search results II: $I_3$, $I_{63}$, $I_{31}$, . . . $I_J$ that are generated from the layout ranker 206, which is online. These image search results II 218 generated have been ranked and reordered according to the similarities between the color layout of images and the interest color layout from interest color selection and interest layout specification provided by the user 108 and using image search results I 204. These are final image search results for the color layout relevance application program 106 until the user 108 starts the process by making a different interest color layout selection.

FIG. 3 is a flowchart showing the exemplary process 300 for the color layout relevance approach 300 of FIG. 1. The flowchart provides an exemplary implementation of the color layout relevance application program 106 to provide assistance in understanding the process 300. Starting on the left side is block 112, representing the color layout extraction, which is computed off-line. After color layout extraction 112 extracted the color layout for images, images, associated texts, and color layouts are used as input to block 202.

Block 202 represents ranking the text. This process 202 also receives a specific text query 110 from the user 108, as shown in the upper right block, to rank the text. Text ranker 202 is performed online, which uses the specified text query 110 as input submitted by the user 108 along with text information from the color layout extraction 112.

Block 204 represents the image search results I that are generated from the text ranker 202, which is online. These image search results I are not the final image search results. The image search results I 204 are used as input to the layout ranker 206.

Block 206 represents the layout ranker. The layout ranker 206 is performed online, which receives information for the interest color layout 208 as input from the user 108 along with the images 204 along with the associated color layouts corresponding to the images. As mentioned, the layout ranker 206 compares the color layouts of the images to the interest color layouts specified by the user 108. Then the similarities between the color layout of the images and the interest color layout are used to reorder the images.

Block 208 represents providing interest color layout to layout ranker 206. As mentioned earlier, interest color layout 208 allows the user 108 to select from a color of interest and to specify the interest color layout.

Layout ranker 206 sorts the images according to a similarity score. The process determines whether to perform ranking the layout 206 on the images. If the process 300 takes a No branch to block 302, the layout ranker will not be performed on the images.

Returning to layout ranker 206, if the process determines to perform ranking layout 206 on the images, the process 300 takes a Yes branch to block 304. Here, ranking layout 206 will be performed on the images.

Block 218 represents the color layout ranking results, which are the final image search results until the user starts the process again, by providing input on interest color layout or starting the process with a new text query. The image search results 218 are generated from the layout ranker 206, which is online. The final image search results for the color layout relevance application program 106 uses feedback on interest color layout 208 from the user 108 to provide final image search results 218 that have been reordered. Following the arrow from block 218, the user 108 may provide interest color layout input, which starts the reordering process.

Exemplary Interest Color Layout

Figure 4:
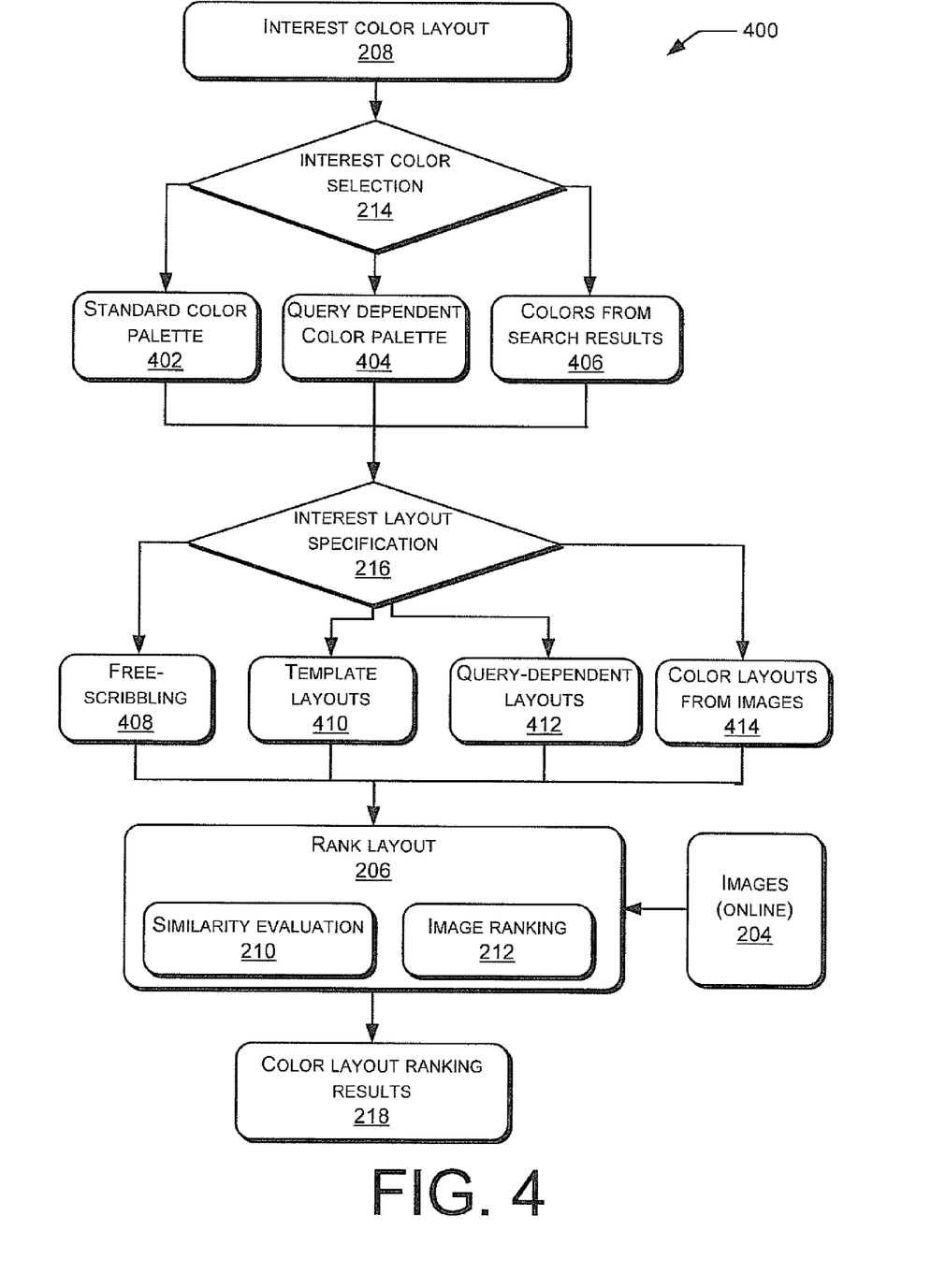
FIG. 4 is a flowchart showing the exemplary process user input for interest color layout.

FIG. 4 is a flowchart showing the exemplary process 400 for user input for interest color layout 208. Block 208 represents interest color layout, which includes interest color selection 214 and interest layout specification 216.

Block 214 shows interest color selection, which provides color palettes to allow the user 108 to select from a color of interest. Interest color selection 214 follows two properties: easy-usage and intelligence.

Shown next in the process 400 are three types of palettes the user 108 may choose from: a standard color palette 402, a query-dependent palette 404, and colors from the search results 406. The standard color palette 402 organizes the colors without using the information from image search results. The query-dependent palette 404 mines image search results, and presents the most-frequent colors appearing in image search results. The colors from the search results 406 is a color palette generated directly using images selected from the image search results. Specifically, the user 108 can drag an image as the color palette, and select the colors from the image.

The user 108 selects the interest color 214 from one of the three types of palettes: the standard color palette 402, the query-dependent palette 404, or the colors from the search results 406. Once the user 108 has selected, the process 400 moves to the next selection.

The process 400 moves to interest layout specification 216. Here, the user 108 can specify the layouts using several specification schemes. The user 108 may select from four specification schemes: a free-scribbling 408, a template layout 410, query-dependent layouts 412, layout from an example image 414.

Figure 8:
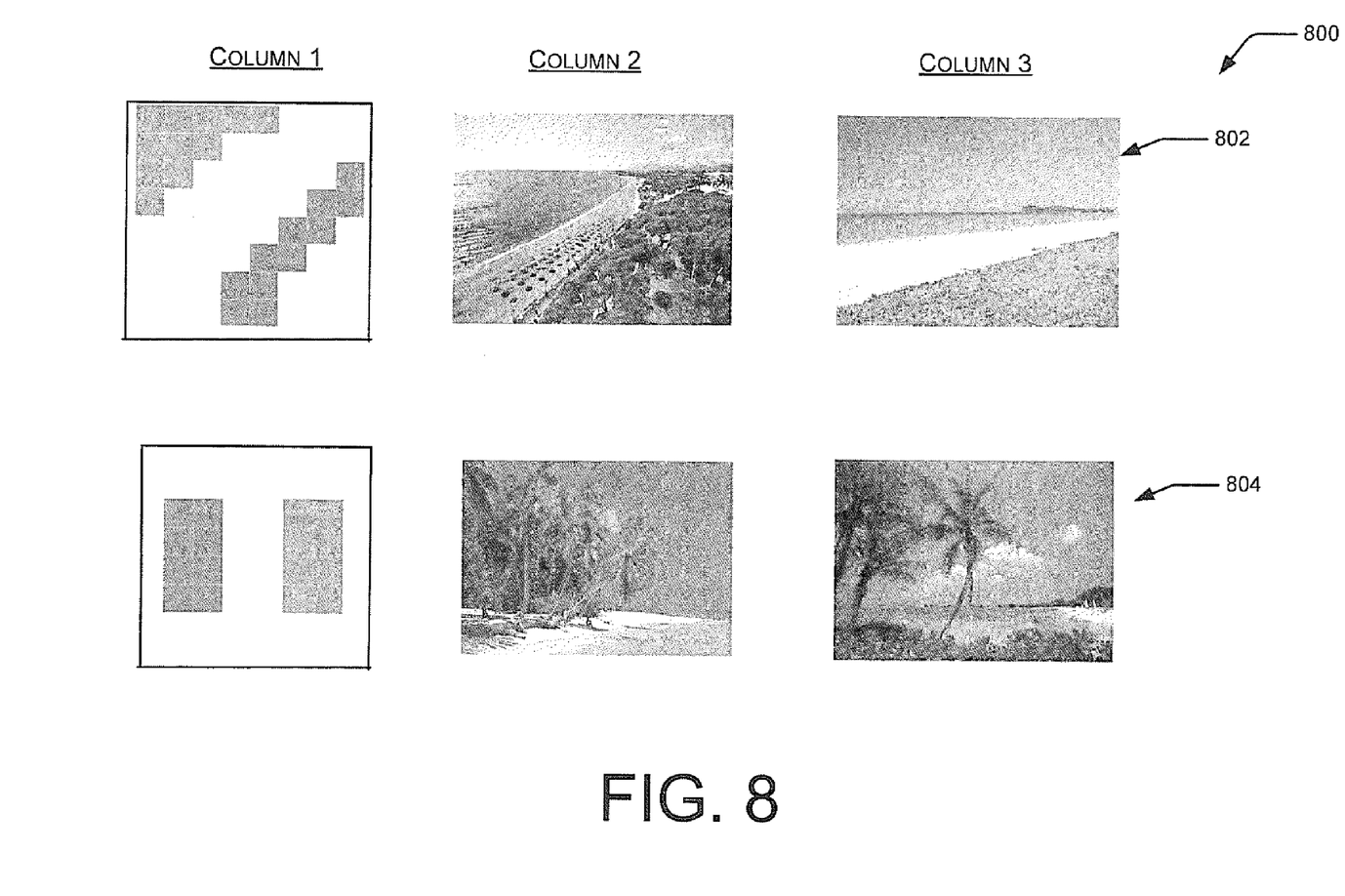
FIG. 8 is a block diagram showing an exemplary free-scribbling for interactively ranking image search results using color layout relevance.

The free-scribbling 408 allows the user 108 to freely draw strokes to indicate the interest layout. FIG. 8 illustrates an example of free scribbling.

The template layout 410 allows the user 108 to select an interest layout from a set of templates, and can change the color lying in a stroke. The template layout 410 is common for all the text queries. The template layouts 410 include but are not limited to, designs with regions of rectangles or squares that may be overlying or positioned separately; regions of colors that are angled in various color schemes; regions of colors in cross hatch designs; regions of colors with several layers in overlying color schemes; and the like.

The query-dependent layouts 412 allows the user 108 to select layout types that have been predefined, based on the query submitted by the user 108. The query-dependent layouts 412 are mined from the image search results that correspond to the text query.

The layout from an example or a sample 414 allows the user 108 to select an example or a sample from the image search results. The user may draw on the example or sample image to indicate the interest color layout. Furthermore, the image may be dragged into the interface of interest color layout.

The process 400 moves to layout ranker 206 for ranking the images. Layout ranker 206 receives information for the interest layout 208 as input based on the interest color layout by the user 108 along with the image search results 204 associated with the corresponding color layouts generated from the text ranker 202.

As mentioned earlier, the layout ranker 206 includes two substeps: similarity evaluation (SE) scheme 210 and image ranking (IR) 212. Similarity evaluation (SE) scheme 210 satisfies two properties: computationally efficient and discriminative. Image ranking (IR) 212 is obtained by directly sorting the image search results 204 using a similarity score from the similarity evaluation scheme 210.

Block 218 represents color layout ranking results, which are the image search results II generated from the layout ranker 206. These image search results II 218 generated have been ranked according to the similarities between color layouts of images and interest color layout from interest color selection 214 and interest layout specification 216 provided by the user 108 and using image search results I 204.

Illustrative User Interface

Figure 5:
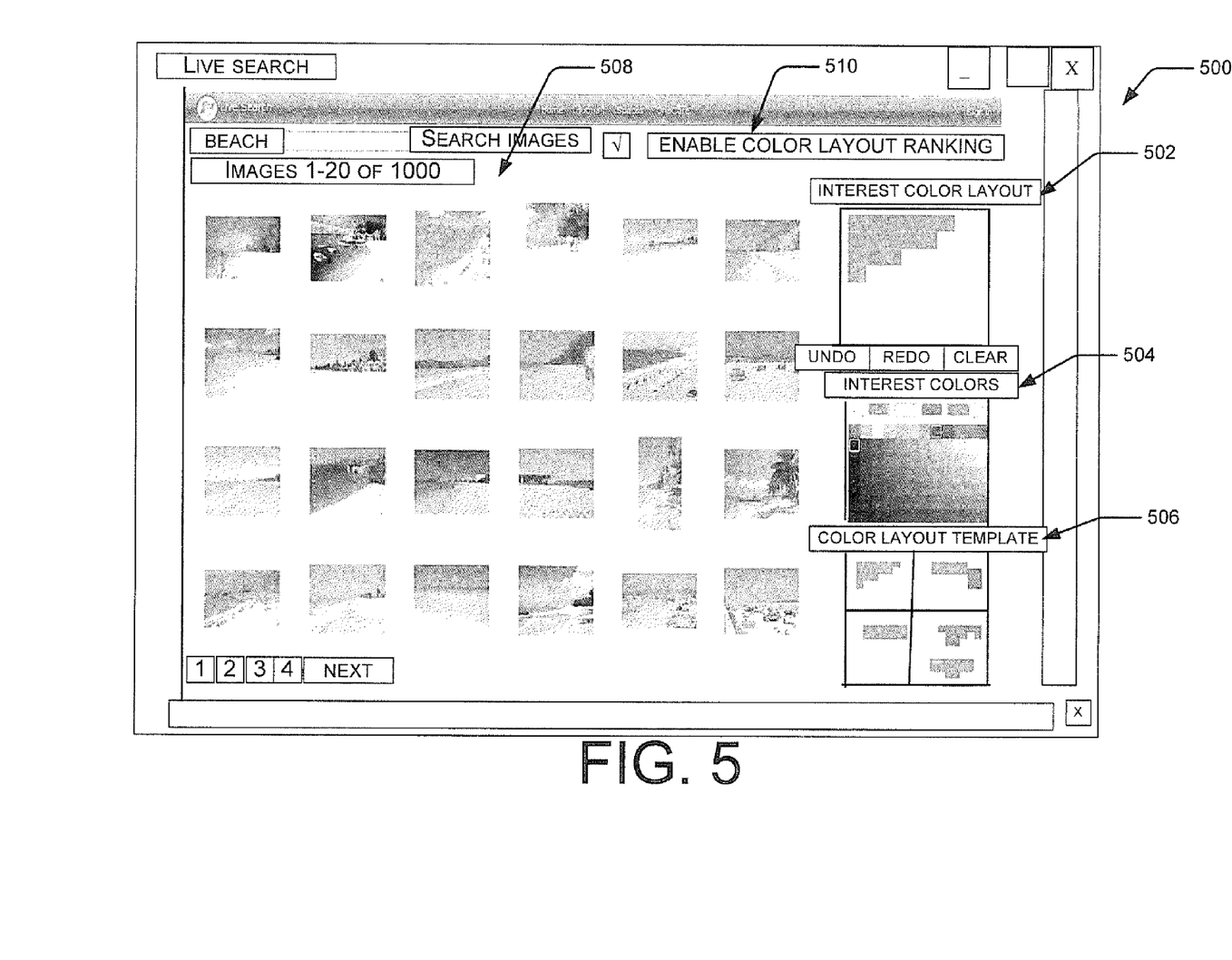
FIG. 5 is a block diagram of an exemplary user interface for interactively ranking image search results using color layout relevance.

FIG. 5 is a block diagram of an exemplary user interface 500 for the color layout relevance application program 106. The user interface 500 allows users to select colors of interest and to specify the color layout. In particular, the user interface 500 offers convenience, flexibility, and adaptability. The user interface 500 offers convenience by letting the user 108 specify the color layout of interest without any special knowledge or skills. The user interface offers flexibility by presenting several color specification schemes: free-scribble 408, template layout 410, query-dependent layouts 412, and a layout from an example image 414. As mentioned, different users may freely select different schemes that are tailored for their particular goals, needs, interests, desires, and the like. Furthermore, the user interface 500 offers adaptability by mining the color distribution image search results per query, and adaptively provides the color palette associated with the specific search results. The color layout relevance application program 106 analyzes the color layouts and present query-dependent color layout templates to the users.

Shown at 502 is a block illustrating the option for interest color layout. In this option is where the user 108 may scribble to specify the interest color layout. Also shown are options the user 108 may apply for the interest color layout, such as "undo, redo, clear".

Shown at 504 is a block illustrating the option for interest colors. In this option is where the user 108 may freely select interest colors from the color palette.

Shown at 506 is a block illustrating the option for color layout template. In this option is where the user 108 may select predefined color layout templates, which includes query independent layout templates and query dependent layouts that are mined from the image search results corresponding to the query. Shown as options for the color layout templates are four different templates.

Shown at 508 are the image search results, the original results from text query or the results reordered based on the interest color layout, 1-20 images are shown.

Shown at 510 is a box checked for enabling color layout ranking. This box allows the user to be able to determine whether to turn on the feature for color layout ranking. There may be times when the user is looking for images without desiring the color layout ranking to be turned on.

The user interface for the color layout relevance application program 106 may include a browser toolbar integrated with the ranking image search results. This toolbar enables the user to view an item in the ranking image search results in a separate browser without interrupting the image research results. Also the user interface for the color layout relevance application program 106 may allow the user to save an item from the ranking image search results into a file, which enables the user to open the item in the file for later use, move the file to another computing device, or to share the file with another user.

Exemplary Color Layout Extraction

Figure 6:
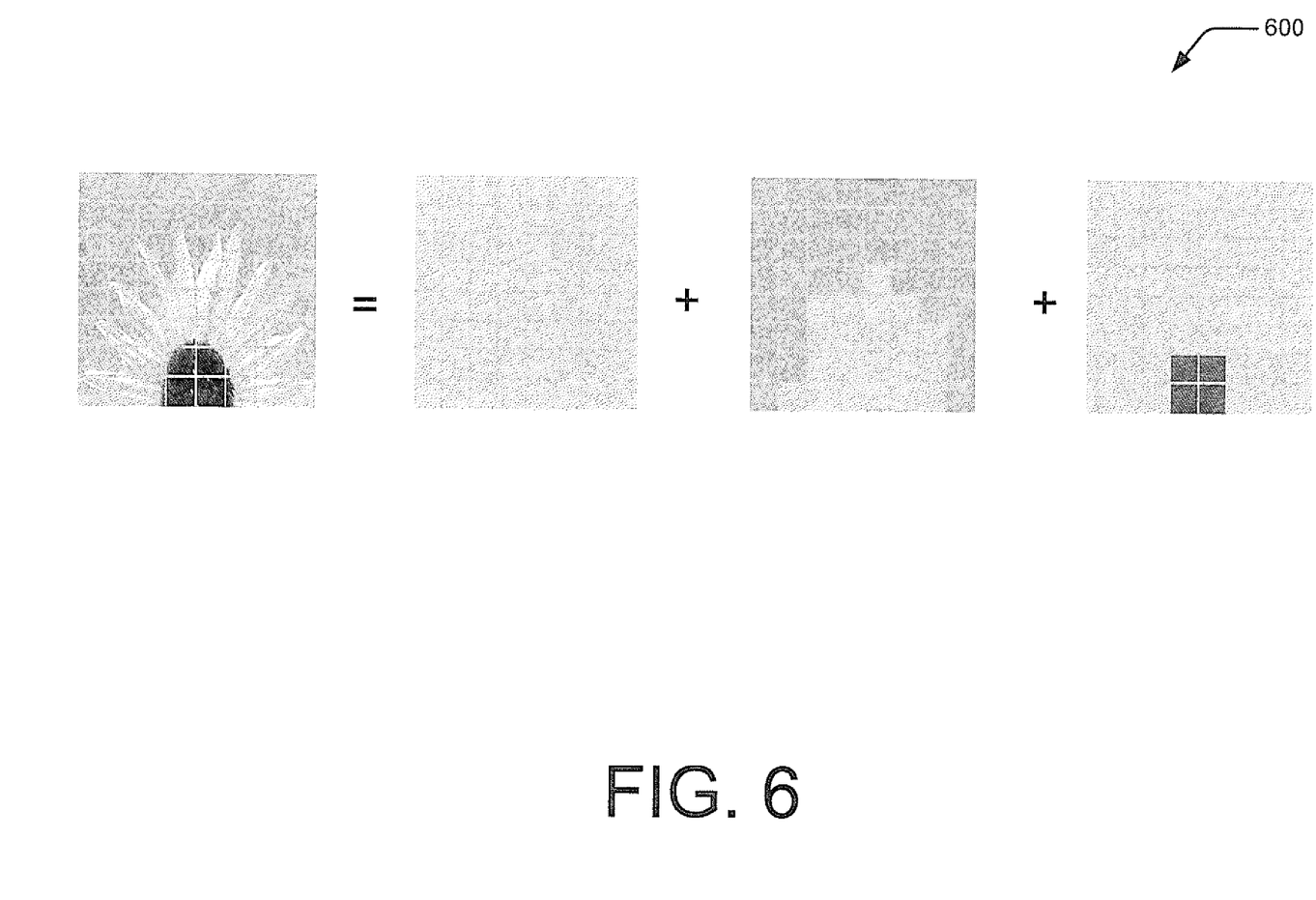
FIG. 6 is a block diagram showing an exemplary color layout extraction for interactively ranking image search results using color layout relevance.

FIG. 6 is a block diagram showing an exemplary color layout extraction 600 for interactively ranking image search results using color layout relevance. As mentioned previously, color layout extraction includes two steps: extracting representative colors for each grid and concatenating the grids into several layouts with each corresponding to the same quantized color.

The image is first divided uniformly into g×g grids. For each grid (x, y), the color extraction process 600 aims to find several dominant colors, $C_{xy}=\{c_{xy}^i\}$, represent the colors in this grid. The dominant colors are found by the following discussion. In each grid, the color layout relevance application program 106 calculates the frequencies for all the colors, and sort them according to the frequencies. The color layout extraction 112 selects the colors corresponding to the first k largest frequency such that $f_{i-1}<2f_i$, $\forall i \leq k$ and $i \neq 1$. The process finds g=8 works well in the process.

As preprocessing steps, the color layout extraction 112 first transforms the red, green, blue (RGB) color space into the hue, saturation, value (HSV) space, which is quantized into 12×4×4 i.e., totally 192 colors, and for each, the color layout relevance application program 106 performs a median filtering on the HSV images by setting the window width as 5.

After extracting the colors in each grid for each image, the color layout extraction 112 shows the representative color set as equation:

$$C = u_{xy} C_{xy}.$$

Then for each color c ∈ C, the color layout extraction 112 compute the layout as a binary vector l such that $$l_k = \begin{cases} 1 & c_{xy}^i = c, \exists c_{xy}^i \in C_{xy}, \\ 0 & \text{else}, \end{cases}$$

where k is one dimensional index of two dimensional indices (x,y). Then in summary, the color layouts of the image is represented by $I=\{(c_r,l_r)\}$. This extraction process is very simple and can be efficiently performed. The extracted color layout feature can effectively represent the image layout, and is proved very valuable by combining the proposed similarity evaluation scheme.

Since l is a binary vector, the color layout relevance application program 106 represents it in a compact manner by several byte variables. i.e., $[b_1, \ldots, b_n]^T$, which will definitely save the storage and bring fast similarity evaluation by using a precomputed lookup table. For convenience, the color layout relevance application program 106 will use the binary vector l in the following discussion.

Illustrative Color Layout Similarity Evaluation with Equations

Figure 7:
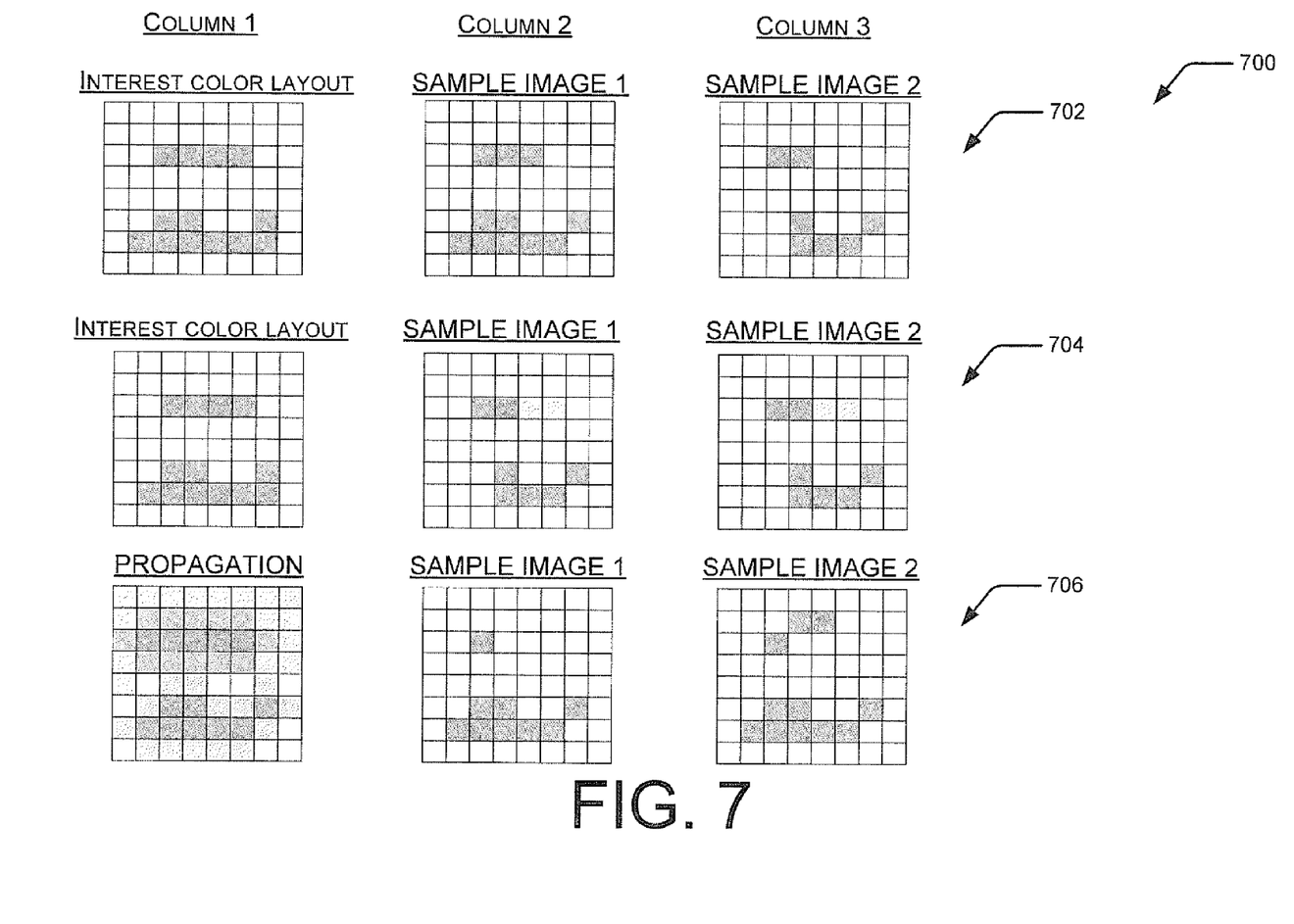
FIG. 7 is a block diagram showing an exemplary color layout similarity evaluation for interactively ranking image search results using color layout relevance.

FIG. 7 is a block diagram showing an exemplary color layout similarity evaluation 700 for interactively ranking image search results using the color layout application program 106.

The color layout relevance application program 106 evaluates the similarity between interest color layout and color layout of any image in image search results. Suppose the color layout of the image is denoted as $I=\{(c_k,l_k)\}$, and the interest color layout is denoted as $Q=\{(c_q,1_q)\}$. The similarity definition is composed of three aspects: a color appearance compatibility 702, a spatial distribution consistency 704, and a contextual layout similarity 706.

The color appearance compatibility is shown in a row identified by 702. Shown along row 702 in the first column is the interest color layout, in the second column the color layout of sample image 1, and in the third column the color layout of sample image 2. As shown along row 702, the sample image 1 in the second column is more compatible to the interest color layout in the first column than the sample image 2 in the third column.

The compatibility evaluation process can be described as follows. For each color in the interest color layout, the color layout relevance application program 106 compares the color layout for each interest color and the layouts of all the colors in the image, and aggregates the similarities with the color similarity as the weights to get the compatibility of the individual color layout with the image. Then, the color layout relevance application program 106 can obtain the overall compatibility by multiplying all the compatibilities. Mathematically, this process is formulated as:

$$s_a(Q, I) = \sum_{q|c_q \in C_q} \frac{1}{Z_q} s_a((c_q, l_q), I)$$

$$= \sum_{q|c_q \in C_q} \frac{1}{Z_q} \sum_{k|c_k \in C_i} sim(c_q, c_k) sim(l_q, l_k),$$

where $C_q$ and $C_i$ are the representative color sets for interest color layout and image color layout, $Z_q$ is a normalization variable is equal to one norm of $l_q$, $\|l_q\|_1$, $s_a((c_q, l_q), \mathcal{I})$ is to evaluate the compatibility between the individual color layout, $(c_q, l_q)$, and the whole image color layout $\mathcal{I}$, $sim(c_q, c_k)$ is the color similarity between $c_q$ and $c_k$, $sim(l_q,l_k)$ is the layout component-wise similarity or spatial occurrence consistency between $l_q$ and $l_k$. The details of these two similarities will be discussed later.

Shown in a row identified by 704 is the spatial distribution consistency. Shown along row 704 in the first column is the interest color layout, in the second column is the color layout of sample image 1, and in the third column is the color layout of sample image 2. The difference between the sample image 1 in column 2 and the sample image 2 in column 3 lies in two grids. By using the compatibility evaluation equation shown:

$$s_a(Q, I) = \sum_{q|c_q \in C_q} \frac{1}{Z_q} s_a((c_q, l_q), I)$$

-continued $$= \sum_{q|c_q \in C_q} \frac{1}{Z_q} \sum_{k|c_k \in C_i} sim(c_q, c_k) sim(l_q, l_k),$$

The similarity measure may lead to the similar (even same) score. However, intuition may tell the user 108 that sample image 1 is more similar with the interest layout because the "aqua" color in sample image 2 appearing in the top region corresponding to the "blue" color in the interest color layout is more similar to the "green" color in the bottom region of the interest color layout. This is an example of the spatial relationship inconsistency of different colors. Therefore, the color layout relevance application program 106 introduces a spatial distribution consistency 704 evaluation scheme. Intuitively, it is preferred that the color appearing in the region corresponding to the interest color region should be less similar than the other interest colors. Thus, the color layout relevance application program 106 checks each region associated with each interest color and computes the spatial distribution consistency 704.

Mathematically, the spatial distribution consistency 704 is defined as $$s_s(Q, \mathcal{I}) = \sum_{q|c_q \in C_q} \frac{1}{Z_q} s_s((c_q, l_q), \mathcal{I})$$

$$= \sum_{q|c_q \in C_q} \frac{1}{Z_q} \sum_{k|c_k \in C_I} asim(c_q, c_k, C_q) sim(l_k, l_q)$$

$$= \sum_{q|c_q \in C_q} \frac{1}{Z_q} \sum_{k|c_k \in C_I} \left[ \min_{q'|c_{q'} \in C_q, q' \neq q} (sim(c_q, c_k) - sim(c_{q'}, c_k)) sim(l_k, l_q) \right],$$

where $Z_q = \|l_q\|_1$, $asim(c_q, c_k, C_q)$ is the similarity between interest color $c_q$ and color $c_k$, adjusted by all the interest colors $c_q$. Combining it with the spatial occurrence consistency $sim(l_k, l_q)$, the measure will reflect the consistency degree between the spatial relations of interest colors in interest color layout and the ones of colors in the image.

Shown in a row identified by 706 is the contextual layout similarity. Sometimes the user 108 may only scribble to indicate a rough color layout query. Due to the roughness, it is insufficient for layout similarity to only consider the scribbled regions. Shown in the first column is the interest color layout/propagation, in the second column is the sample image 1 and in the third column the sample image 2. It is clear that their similarities are the same, if the interest color layout is given as shown in the first column. However, the sample image 2 in the third column is more similar to the interest color layout than sample image 1 in the second column.

The color layout relevance application program 106 proposes a scheme to "generalize" interest color layout. The color layout relevance application program 106 processes the query color layout by viewing the scribbled regions as seeds. Specifically, the color layout relevance application program 106 adopts the front propagation scheme to propagate the seeded colors. To differentiate the propagated region from the original color region, the color layout relevance application program 106 assigns different weights to the propagated regions according to the distance from the seed regions.

For computational efficiency, the color layout relevance application program 106 assigns only two different weights for the propagated color, i.e., setting weight as 0.5 for the near region, and 0.25 for the far region. The propagation in the first column along row 706 shows a propagation example in which the weights are differentiated by the color saturation. The color layout relevance application program 106 denotes the propagated weighted color layouts as $\overline{Q} = \{(w_q, c_q, \overline{l}_q)\}$, for example, in the propagated interest color layout shown in the first column. For example, the propagated "blue" region is represented by two types of components with different weights and spatial layout, but the same color. The similarity with respect to those color layouts, is shown by the equation below as:

$$s_c(Q, \mathcal{I}) = s_a^1(\overline{Q}, \mathcal{I}) + s_s^1(\overline{Q}, \mathcal{I})$$

where $s_a^1(\overline{Q}, \mathcal{I})$ is a contextual color appearance compatibility, and $s_s^1(\overline{Q}, \mathcal{I})$ is contextual spatial distribution consistency. They are defined as shown in the equations below as:

$$s'_a(\overline{Q}, \mathcal{I}) = \sum_{q|c_q \in \overline{C}_q} \frac{w_q}{Z_q} s_a((c_q, \overline{l}_q), \mathcal{I}),$$

$$s'_s(\overline{Q}, \mathcal{I}) = \sum_{q|c_q \in \overline{C}_q} \frac{w_q}{Z_q} s_s((c_q, \overline{l}_q), \mathcal{I}),$$

where $Z_q$, $s_a((c_q, \overline{l}_q), \mathcal{I})$, and $s_s((c_q, \overline{l}_q), \mathcal{I})$ are same as defined as the previous two subsections, and $\overline{C}_q$ is the weighted representative color set for the propagated interest color layout.

After obtaining all the above three similarities, the whole similarity between I and Q is written as equation:

$$s(Q, \mathcal{I}) = \alpha_a s_a(Q, \mathcal{I}) + \alpha_s s_s(Q, \mathcal{I}) + \alpha_c s_c(Q, \mathcal{I})$$

where $\alpha_a$, $\alpha_s$ and $\alpha_c$ are the weights for different similarity aspects. The color layout relevance application program 106 assigns a less weight to $s_c(\bullet, \bullet)$ since it is a generalized similarity. The equation performs well when $\alpha_a = \alpha_s = 10 \times \alpha_c$.

Illustrative Color and Layout Component-Wise Similarity

The color similarity is evaluated in the HSV color space based on the distance. The color distance between $c_i$ and $c_j$ is defined in equation as:

$$d(c_i, c_j) = \sqrt{(s_i \cos h_i - s_j \cos h_j)^2 + (s_i \sin h_i - s_j \sin h_j)^2 + (v_i - v_j)^2},$$

where $[h_i, s_i, v_i]^T = c_i$ and $[h_j, s_j, v_j]^T = c_j$. Based on this distance, the color layout relevance application program 106 can define color similarity as shown in the equation below as:

$$s(c_i, c_j) = \left(1 - \frac{d(c_i, c_j)}{d_{max}}\right)^\beta,$$

where $d_{max} = \max_{mn} d(c_m, c_n)$ and $\beta = 2$ and $\beta = 2$.

Practice shows that users tend to be more sensitive to the H (hue) color component. Hence, the color layout relevance application program 106 may pay more attention on this H component. The color layout relevance application program 106 defines the similarity of H components as:

$$s(h_i, h_j) = \frac{1}{\sigma\sqrt{2\pi}}\exp\left(-\frac{(h_i - h_j)^2}{2\sigma^2}\right), \text{ where } \sigma = \frac{\pi}{3}$$

with h is range from [0,2π]. This assignment makes the similarity between different colors with large different of H component much smaller. Then, the overall color similarity is shown in the equation below as:

$$\text{sim}(c_i, c_j) = s(h_i, h_j) \times s(c_i, c_j).$$

As mentioned before, the color layout relevance application program 106 has quantized the HSV space into 12×4×4 color, i.e., a total of 192 colors. The color layout relevance application program 106 precomputes their similarities and store them in a lookup table. In this manner, the color layout relevance application program 106 reduces the computation cost by only looking up the table instead of an on-line computation.

Illustrative Layout Component-Wise Similarity

The component-wise similarity between layouts is very simple and evaluated as the inner product, $\text{sim}(l_q, \tilde{l}_k) = l_q^T l_k$. As mentioned before, l is a binary vector with entries equal to 0 or 1, and represented by a byte variable vector $[b_1, \ldots, b_n]^T$ as mentioned before. Hence the inner product can be quickly evaluated by the and operation as the following:

$$l_q^T l_k = \sum_{i=1}^{n} \text{count}(b_{qi} \wedge b_{ki})$$

where the basic operation ∧ is and operation on byte variables, and count (•) is the number of set bits. There are a total of 256 different values for a byte variable. To avoid online and operation, the color layout relevance application program 106 precomputes a 256×256 lookup table, in which each entry is the component-wise similarity.

Illustrative Free-Scribbling for Color Layout Relevance

FIG. 8 is a block diagram showing an exemplary free-scribbling 800 for the color layout relevance application program 106. Shown in columns 2 and 3 are images the user 108 may desire for their work product. The user 108 may want to find the images with particular color spatial distribution. For example, the user 108 may be interested in images with a blue sky on top and green grasses on bottom are shown. In this instance, images of blue skies, green grasses or green trees. The user 108 would freely scribble in the blank image in column 1 to obtain the color layout of his or her choice.

Illustrative Color Layout Ranking Results

Figure 9:
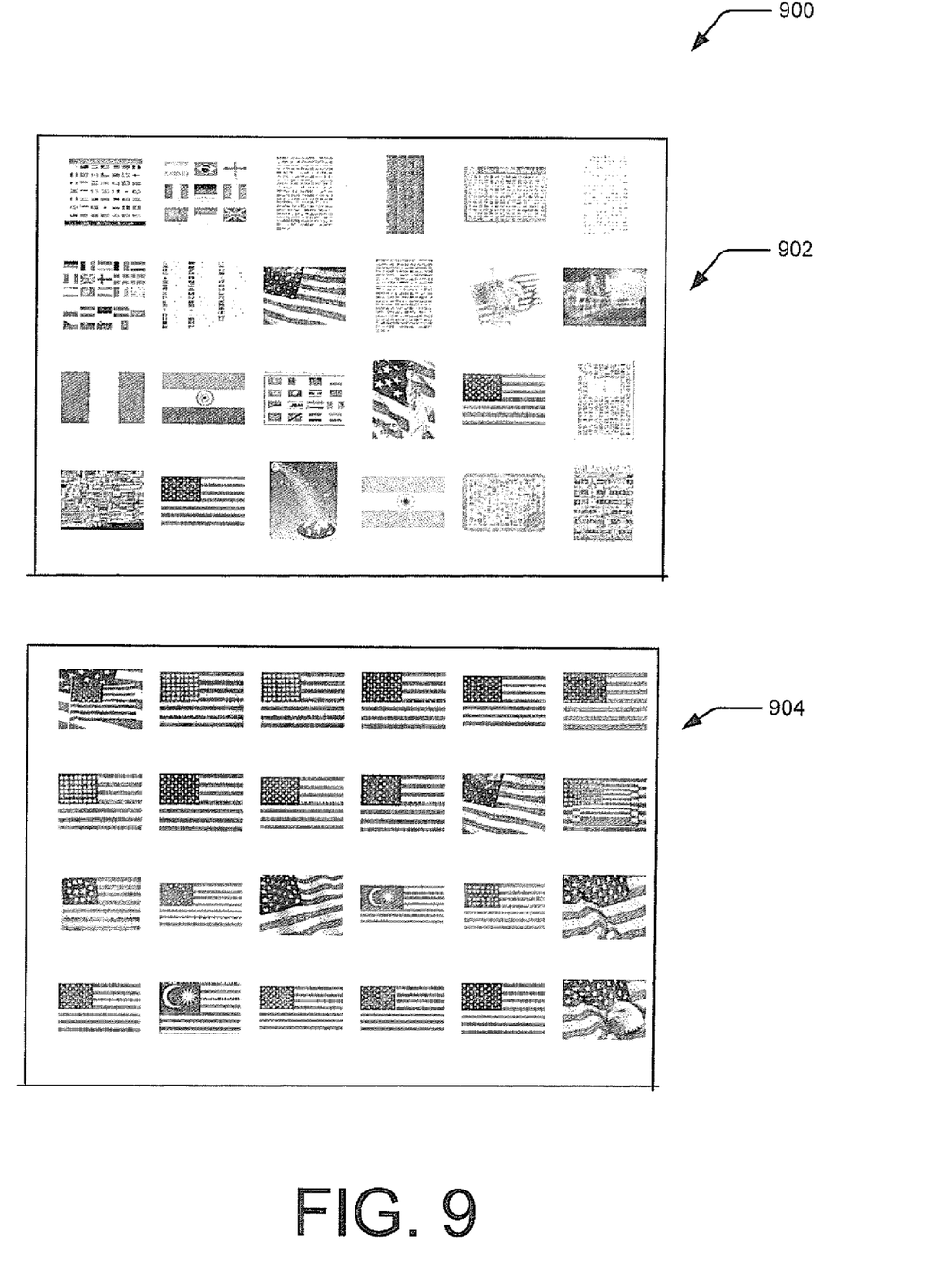
FIG. 9 is a block diagram showing an exemplary color layout ranking results for interactively ranking image search results using color layout relevance.

FIG. 9 is a block diagram showing an exemplary color layout ranking results 900 for interactively ranking image search results using color layout relevance. The text query 110 from the user 108 may have been along the lines of "flags". Shown at 902 is the original ranking of the flags. However, the user 108 then provides input to the interest color layout 208 and the image search results I 204 along with the interest color layout are input to the layout ranker 206. Thus, the layout ranker 206 will reorder the results and obtain the color layout ranking results shown at 904.

Illustrative Operating System for Color Layout Relevance

Figure 10:
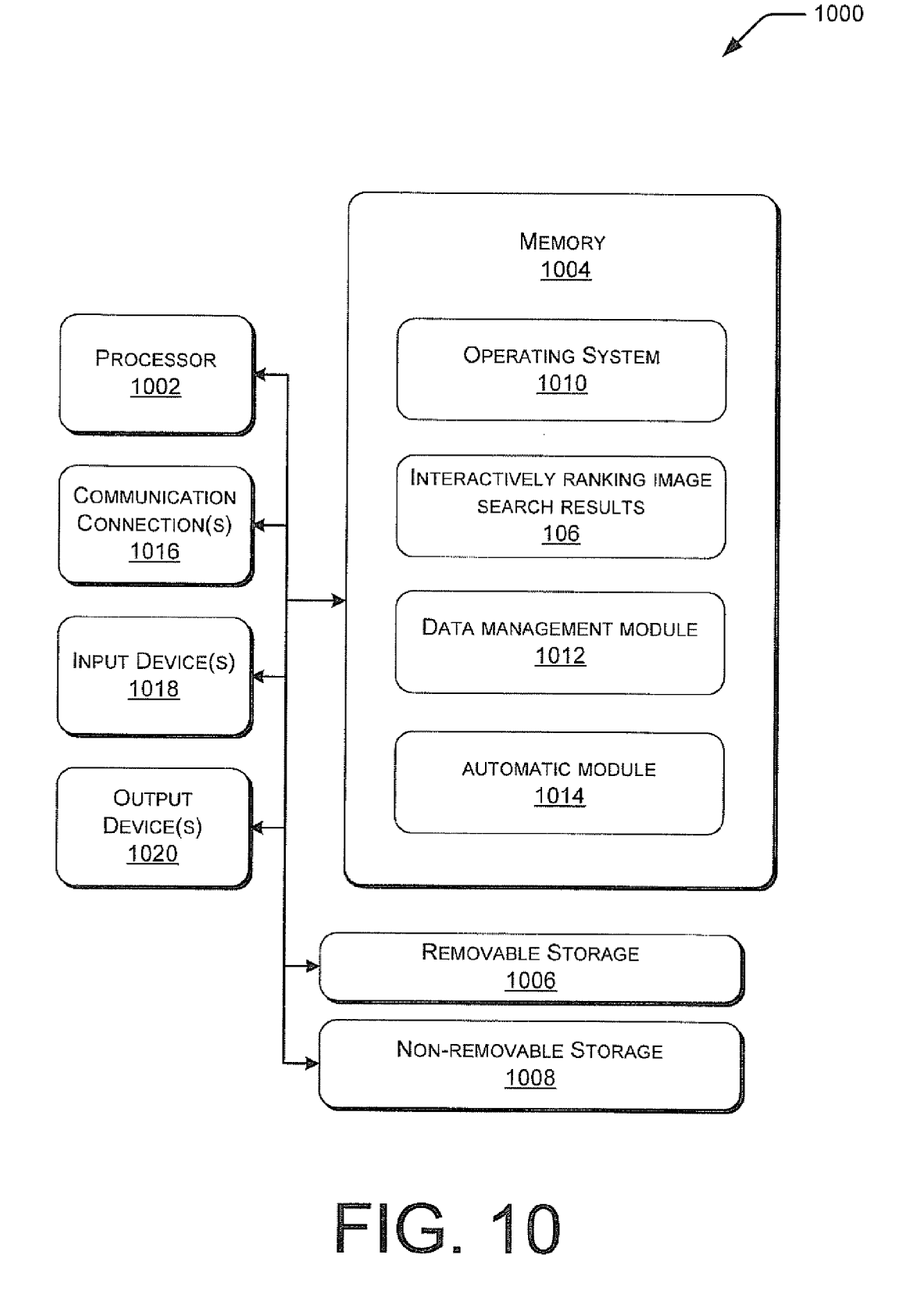
FIG. 10 is a block diagram showing an exemplary operating system for interactively ranking image search results using color layout relevance.

FIG. 10 is a schematic block diagram of an exemplary general operating system 1000. The system 1000 may be configured as any suitable system capable of implementing the interactively ranking image search results using color layout relevance application program 106. In one exemplary configuration, the system comprises at least one processor 1002 and a memory 1004. The processing unit 1002 may be implemented as appropriate in hardware, software, firmware, or combinations thereof. Software or firmware implementations of the processing unit 1002 may include computer- or machine-executable instructions written in any suitable programming language to perform the various functions described.

Memory 1004 may store programs of instructions that are loadable, embedded, or encoded, and executable on the processor 1002, as well as data generated during the execution of these programs. Depending on the configuration and type of computing device, memory 1004 may be volatile (such as RAM) and/or non-volatile (such as ROM, flash memory, etc.). The system 1000 may also include additional removable storage 1006 and/or non-removable storage 1008 including, but not limited to, magnetic storage, optical disks, and/or tape storage. The disk drives and their associated computer-readable medium may provide non-volatile storage of computer readable instructions, data structures, program modules, and other data for the communication devices.

Turning to the contents of the memory 1004 in more detail, may include an operating system 1010, the interactively ranking image search results using color layout relevance application program 106 for implementing all or a part of interactively ranking image search results using color layout relevance method. For example, the system 1000 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 1004 includes the interactively ranking image search results using color layout relevance application program 106, a data management module 1012, and an automatic module 1014. The data management module 1012 stores and manages storage of information, such as color layout extraction information, images, and the like, and may communicate with one or more local and/or remote databases or services. The automatic module 1014 allows the process to operate without human intervention.

Memory 1004, removable storage 1006, and non-removable storage 1008 are all examples of computer storage medium. Additional types of computer storage medium that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 104.

The system 1000 may also contain communications connection(s) 1016 that allow processor 1002 to communicate with servers, the user terminals, and/or other devices on a network. Communications connection(s) 1016 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media. The term computer readable medium as used herein includes both storage medium and communication medium.

The system 1000 may also include input device(s) 1018 such as a keyboard, mouse, pen, voice input device, touch input device, etc., and output device(s) 1020, such as a display, speakers, printer, etc. The system 1000 may include a database hosted on the processor 1002. All these devices are well known in the art and need not be discussed at length here.

The subject matter described above can be implemented in hardware, or software, or in both hardware and software. Although embodiments of click-through log mining for ads have been described in language specific to structural features and/or methodological acts, it is to be understood that the subject matter defined in the appended claims is not necessarily limited to the specific features or acts described above. Rather, the specific features and acts are disclosed as exemplary forms of exemplary implementations of click-through log mining for ads. For example, the methodological acts need not be performed in the order or combinations described herein, and may be performed in any combination of one or more acts.

The invention claimed is:

1. A method for interactively ranking image search results by using a color layout relevance, implemented at least in part by a computing device, the method comprising:
    extracting color layouts for images after the images are crawled from the internet;
    receiving a text query for an image search;
    evaluating a similarity between an interest color layout and a color layout of any image in an image search results, wherein the similarity is based on a color appearance compatibility, a spatial distribution consistency, and a contextual layout similarity, wherein the color appearance compatibility, the spatial distribution consistency, and the contextual layout similarity are based on a color similarity and a layout component-wise similarity; and
    reordering the image search results based on evaluated similarities between color layouts of images and the interest color layout from the user according to a selection of a color selection palette and a color layout specification scheme.

2. The method of claim 1, wherein the color selection palettes comprises a standard color palette, a query dependent color palette, and a color palette using colors from image search results.

3. The method of claim 1, wherein the color layout specification scheme comprises at least one of:
    a free-scribbling to allow a user to freely draw strokes to indicate an interest layout;
    a template layout to allow the user to select an interest layout from a set of templates, which are common for text queries; and
    query-dependent layouts to allow the user to select an interest layout from a set of query-dependent templates, which are mined from image search results corresponding to the text query; and
    a layout from a sample image to allow the user to select a sample image from the search results and to draw on the sample image to indicate the interest color layout.

4. The method of claim 1, wherein the color appearance compatibility comprises a degree that the colors in the image corresponding to the interest layout region are similar to the colors in the interest color layout.

5. The method of claim 1, wherein the spatial distribution consistency comprises that the color appearing in the region corresponding to the interest color region should be less similar than the other interest colors.

6. The method of claim 1, wherein the contextual layout similarity comprises assigning different weights to a propagated color, the weights are set according to a distance of the grid containing the propagated color from seeded grids.

7. A computing device comprising a processor; a memory storing computer-readable instructions executed on the processor, the computer-readable instructions comprising instructions for:
    receiving a text query for an image search;
    extracting a color layout;
    measuring a similarity based on a color appearance compatibility, a spatial distribution consistency, a contextual layout similarity, a color similarity, and a layout component-wise similarity;
    providing interactive options for the image search results with color selection palettes and color layout specification schemes;
    reordering the image search results using a color layout ranking; and
    presenting ranked image search results in a structured presentation based on the text query and information from the interest color layout.

8. The computing device of claim 7, wherein the color appearance compatibility comprises a degree that the colors in the image corresponding to the interest layout region are similar to the colors in the interest color layout.

9. The computing device of claim 7, wherein the spatial distribution consistency comprises that the color appearing in the region corresponding to the interest color region should be less similar than the other interest colors.

10. The computing device of claim 7, wherein the contextual layout similarity comprises assigning different weights to a propagated color, the weights are set according to a distance of the grid containing the propagated color from seeded grids.

11. The computing device of claim 7, wherein the color selection palettes to indicate interest colors comprises:
    a standard color palette, wherein colors are organized without using information from the image search results;
    a query-dependent color palette, wherein colors that appear most-frequently in the image search results; and
    a color palette generated from selecting images from the image search results.

12. The computing device of claim 7, wherein the color specification scheme comprises:
    a free-scribbling to allow a user to freely draw strokes to indicate an interest layout;
    a template layout to allow the user to select an interest layout from a set of templates, which are common for text queries;
    query-dependent layouts to allow the user to select an interest layout from a set of query-dependent templates, which are mined from image search results corresponding to the text query; and
    a layout from an example image to allow the user to select a sample image from the search results and to draw on the example image to indicate the interest color layout.

13. The computing device of claim 7, further comprising a checkbox feature for turning on a color layout ranking.

* * * * *